(12) United States Patent  (10) Patent No.: US 7,719,923 B2
Volterrani  (45) Date of Patent: May 18, 2010

(54) LOW FREQUENCY MODEL ESTIMATION

(75) Inventor: Stefano Volterrani, Houston, TX (US)

(73) Assignee: WesternGeco L.L.C., Houston, TX (US)

( * ) Notice: Subject to any disclaimer, the term of this patent is extended or adjusted under 35 U.S.C. 154(b) by 0 days.

(21) Appl. No.: 11/447,065

(22) Filed: Jun. 5, 2006

(65) Prior Publication Data

US 2007/0280050 A1    Dec. 6, 2007

(51) Int. Cl.
*G01V 1/00*    (2006.01)
(52) U.S. Cl. ...................................................... 367/32
(58) Field of Classification Search .................. 367/32, 367/73
See application file for complete search history.

(56) References Cited

U.S. PATENT DOCUMENTS

| | | | | |
|---|---|---|---|---|
| 5,583,825 | A * | 12/1996 | Carrazzone et al. | 367/31 |
| 5,798,982 | A * | 8/1998 | He et al. | 367/73 |
| 6,058,073 | A * | 5/2000 | VerWest | 367/31 |
| 6,374,201 | B1 | 4/2002 | Grizon et al. | |
| 6,473,696 | B1 * | 10/2002 | Onyia et al. | 702/6 |
| 6,751,558 | B2 * | 6/2004 | Huffman et al. | 702/14 |
| 2002/0042702 | A1 * | 4/2002 | Calvert et al. | 703/10 |
| 2004/0117123 | A1 * | 6/2004 | Jing | 702/16 |

FOREIGN PATENT DOCUMENTS

WO    WO 2004/095072    11/2004

OTHER PUBLICATIONS

Pendrel, John. Seismic Inversion-A Critical Tool in Resevoir Characterization. Seismic Resevoir Data. Scandanavian Oil-Gas Magazine. No. 5/6. 2006. pp. 19-20, 22.*
Broadhead, Michael. Seismic Noise Estimation and Error Propagation Applied to Post-Stack Seismic Inversion. GEO 2006 Middle East Conference and Exhibition, Mar. 27-29, 2006.*
Contreras, Arturo. Joint Stochastic Inversion of 3D pre-stack seismic data and well logs for high-resolution reservoir characterization and petrophysical modelling; application to deepwater hydrocarbon reservoirs in the central Gulf of Mexico.*
Wang et al. Velocity Estimation from post-stack seismic data and density log by linearized Inversion. SEG Int'l Exposition and 72nd Annual Meeting. Salt Lake City, Utah. Oct. 6-11, 2002.*
Alan R. Huffman and Glenn L. Bowers. Pressure Regimes in Sedimentary Basins and Their Predictions. 2002. ISBN 0891813578. p. 210.*
Seismic Attributes and Their Projected Use in Prediction of Rock Properties and Seismic Facies. http://www.rocksolidimages.com/pdf/attrib.pdf. Posted Mar. 16, 2006.*

(Continued)

*Primary Examiner*—Mark Hellner (57) ABSTRACT

Implementations of various techniques for a seismic inversion method. In one implementation, the method may include estimating a wavelet of a recorded seismic trace at a well location, transforming the recorded seismic trace to a relative seismic impedance trace, estimating a low frequency model trace using the relative seismic impedance trace and adding the low frequency model trace to the relative seismic impedance trace to generate an absolute trace.

13 Claims, 9 Drawing Sheets

OTHER PUBLICATIONS

Contreras, Arturo. Joint Stochastic Inversion of 3D pre-stack seismic data and well logs for high-resolution reservoir characterization and petrophysical modelling; application to deepwater hydrocarbon reservoirs in the central Gulf of Mexico. Jan. 2006.*

Huffman, Pressure Regimes in Sedimentary Basins and their Predictions, 2002, ISBN 0891813578, pp. 177-196.
Huffman, Pressure Regimes in Sedimentary Basins and their Predictions, 2002, ISBN 0891813578, pp. 197-215.

* cited by examiner

LOW FREQUENCY MODEL ESTIMATION

BACKGROUND

1. Field of the Invention

Implementations of various technologies described herein generally relate to seismic inversion.

2. Description of the Related Art

The following descriptions and examples are not admitted to be prior art by virtue of their inclusion within this section.

The success of a seismic inversion generally depends on the extent to which low, non-seismic frequencies away from the well locations may be predicted. Typically, the low, non-seismic frequencies may be estimated by mapping the well data in space using interpreted horizons as a guide. This method may yield reasonable results when the geology is fairly predictable from one well to another. However, in complex geologic settings, such as stacked fluvial channels, this conventional method may fail to deliver acceptable results. Further, in this type of environment, drilling results have confirmed that well interpolation methods fail to predict the correct low frequency response and large errors may be introduced in the inverted seismic volumes.

SUMMARY

Described herein are implementations of various techniques for a seismic inversion method. In one implementation, the method may include estimating a wavelet of a recorded seismic trace at a well location, transforming the recorded seismic trace to a relative seismic impedance trace, estimating a low frequency model trace using the relative seismic impedance trace and adding the low frequency model trace to the relative seismic impedance trace to generate an absolute trace.

Described herein are implementations of various techniques for a method for estimating a low frequency model for use in seismic inversion. In one implementation, such method may include transforming a relative seismic impedance trace using one or more mathematical operations and one or more parameter values to generate a plurality of transformed relative seismic impedance traces.

In another implementation, the method may include determining a mathematical operation and an average parameter value for one or more wells within a seismic survey and transforming a relative seismic impedance trace using the mathematical operation and the average parameter value. The relative seismic impedance trace may be generated by transforming a recorded seismic trace. The method may further include convolving the transformed relative seismic impedance trace with a low pass filter and adding a compaction model to the filtered transformed relative seismic impedance trace to generate the low frequency model trace.

The claimed subject matter is not limited to implementations that solve any or all of the noted disadvantages. Further, the summary section is provided to introduce a selection of concepts in a simplified form that are further described below in the detailed description section. The summary section is not intended to identify key features or essential features of the claimed subject matter, nor is it intended to be used to limit the scope of the claimed subject matter.

BRIEF DESCRIPTION OF THE DRAWINGS

Implementations of various technologies will hereafter be described with reference to the accompanying drawings. It should be understood, however, that the accompanying drawings illustrate only the various implementations described herein and are not meant to limit the scope of various technologies described herein.

DETAILED DESCRIPTION

Figure 1:
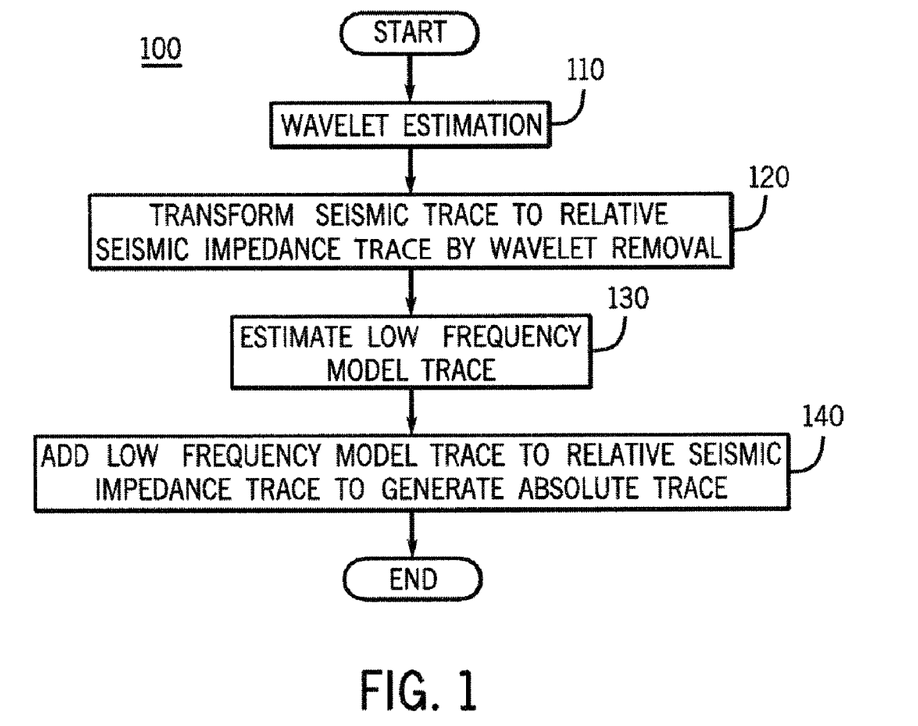
FIG. 1 illustrates a seismic inversion method in accordance with implementations of various techniques described herein.
Figure 3:
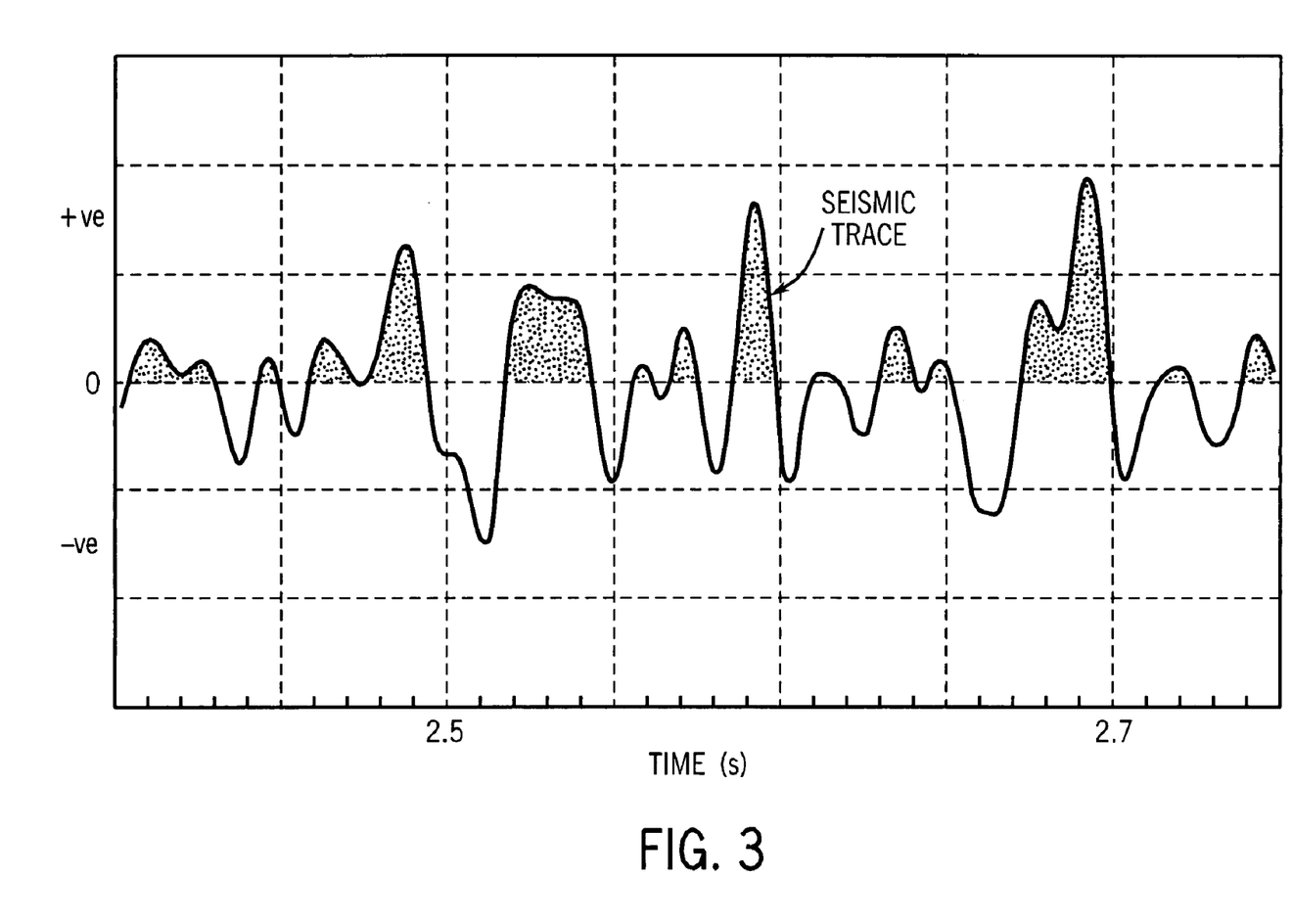
FIG. 3 illustrates an example of a recorded seismic trace signal in time domain.

FIG. 1 illustrates a seismic inversion method 100 in accordance with implementations of various techniques described herein. At step 110, the wavelet of a recorded seismic trace may be estimated. FIG. 3 illustrates an example of a recorded seismic trace signal in time domain. At step 120, the recorded seismic trace may be transformed into a relative seismic impedance trace. The recorded seismic trace may be transformed into the relative seismic impedance trace by any transformation algorithm, such as wavelet removal and the like. The term "relative" in the relative seismic impedance trace may indicate that the impedance trace does not contain any information below the lowermost recorded seismic frequency. Further, the relative seismic impedance trace may be a zero mean impedance trace.

At step 130, a low frequency model trace may be estimated. A low frequency model trace may be defined as a band limited trace in the frequency domain with a frequency range between about 0 Hz and the lowest seismic recorded frequency, e.g., about 6 Hz to about 10 Hz. At step 140, the low frequency model trace may be added to the relative seismic impedance trace to generate an absolute trace. The absolute trace is the final product of seismic inversion. The numerical values of an absolute trace may represent values of the derived attribute, such as P wave impedance, S wave impedance, density and the like.

Figure 2:
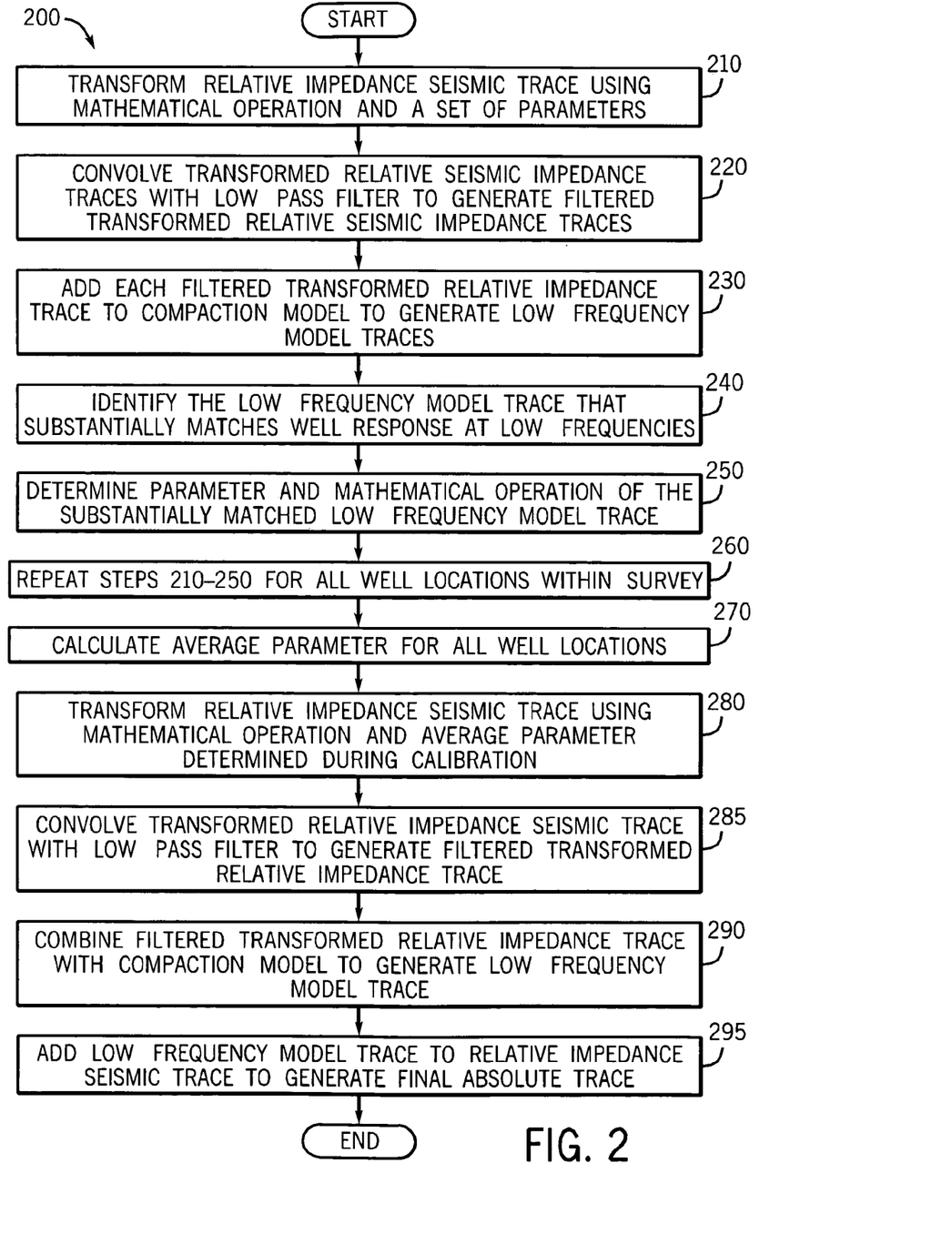
FIG. 2 illustrates a method for estimating a low frequency model trace in accordance with implementations of various techniques described herein.
Figure 4:
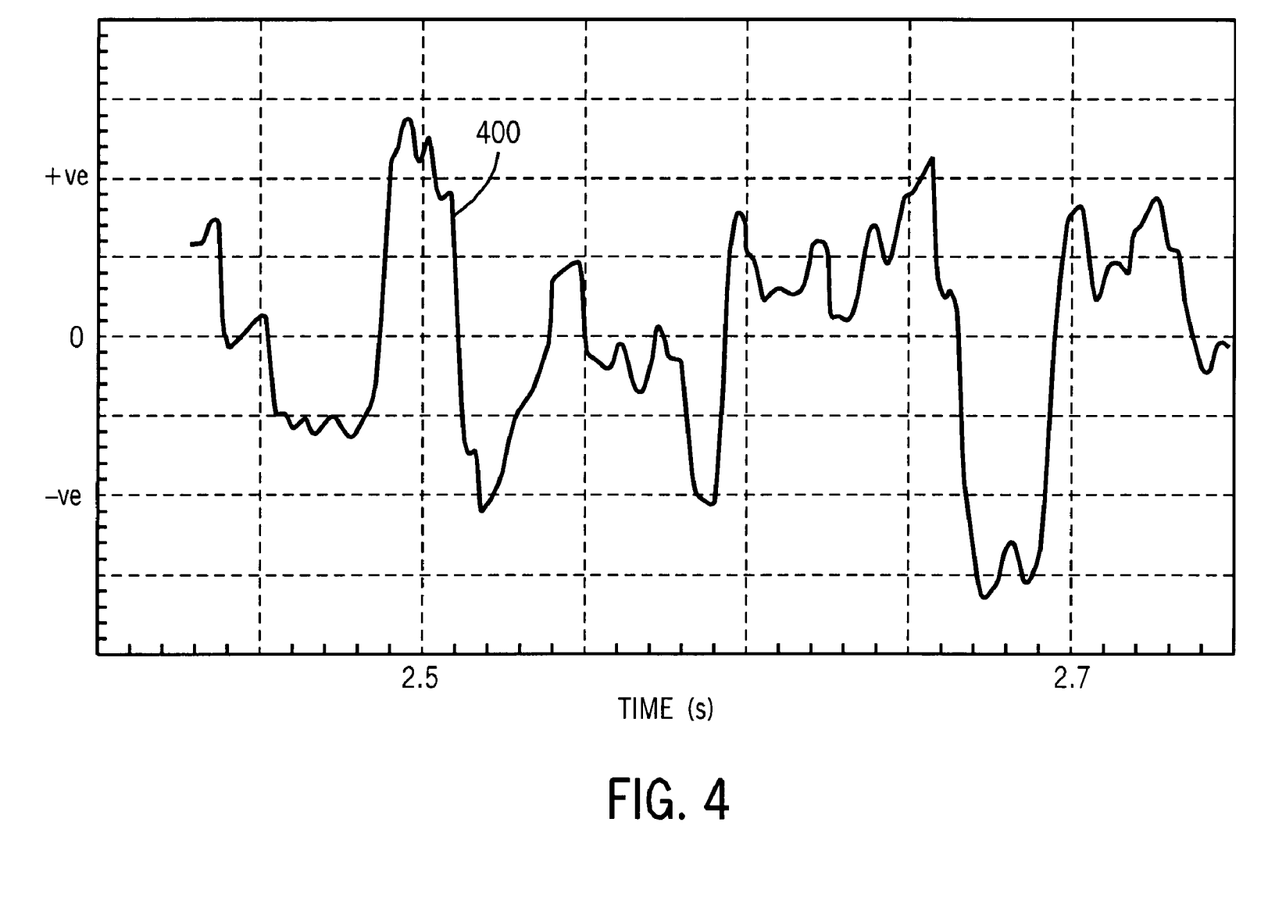
FIG. 4 illustrates a relative seismic impedance trace in accordance with implementations of various techniques described herein.
Figure 5:
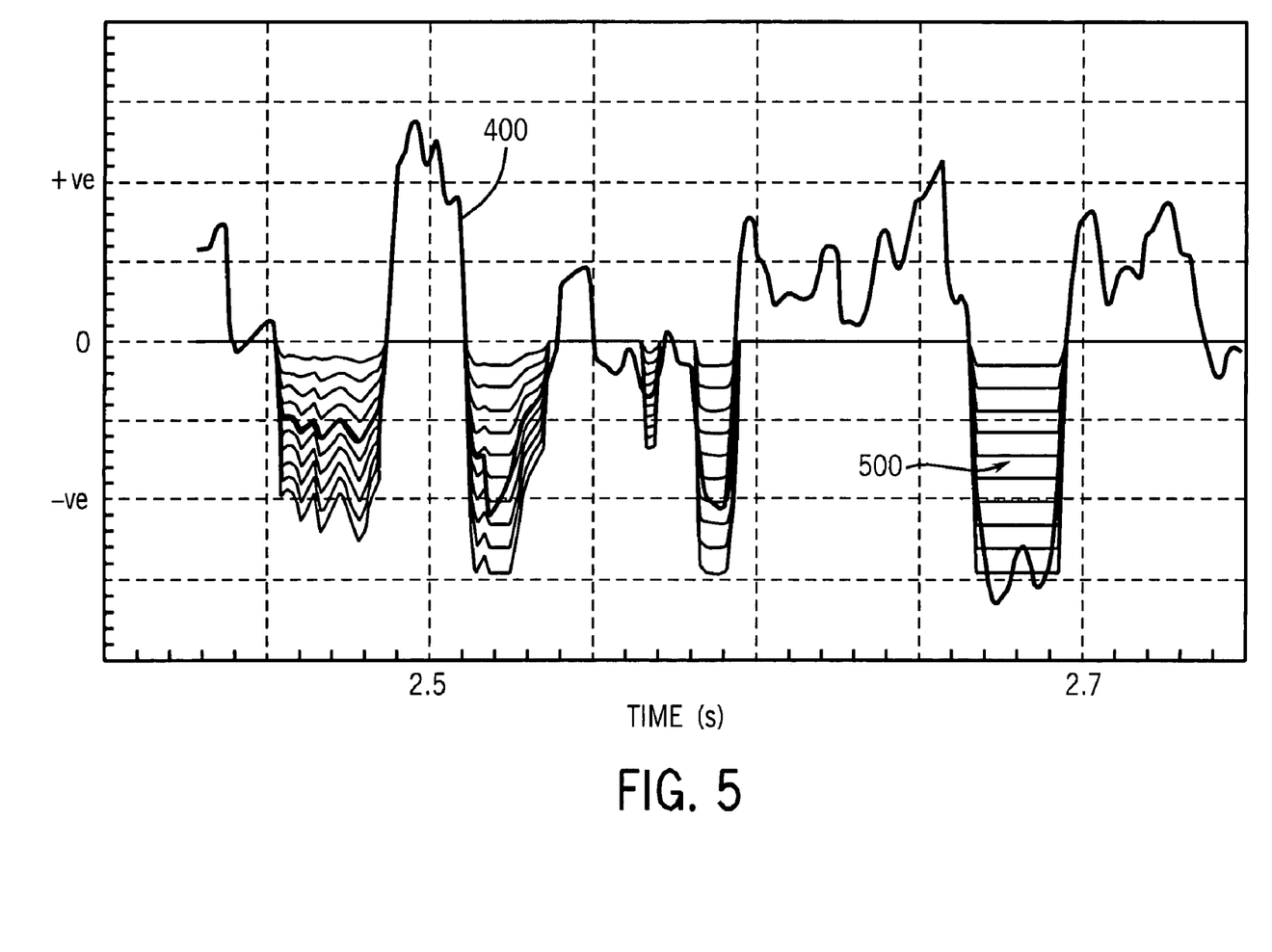
FIG. 5 illustrates a plurality of transformed relative seismic impedance traces in time domain in accordance with implementations of various techniques described herein.

Various techniques described herein may be directed to an improvement to low frequency model trace estimation. More specifically, implementations of various techniques described herein are directed to empirical estimation of low frequency models using recorded seismic traces. FIG. 2 illustrates a method 200 for estimating a low frequency model trace in accordance with implementations of various techniques described herein. In one implementation, steps 210 through 270 may be directed to calibration, which may be configured to generate an average parameter value for all the well locations in the survey and a mathematical operation for use in estimating the low frequency model trace. The low frequency model trace may be estimated using a relative seismic impedance trace. FIG. 4 illustrates a relative seismic impedance trace 400 in accordance with implementations of various techniques described herein. Accordingly, at step 210, a relative seismic impedance trace of a first well within a seismic survey may be transformed using a mathematical operation and a set of parameter values. In one implementation, the mathematical operation may include multiplication by scalars, i.e., scaling. FIG. 5 illustrates a plurality of transformed relative seismic impedance traces 500 in time domain in accordance with implementations of various techniques described herein. In one implementation, the relative seismic impedance trace 400 may be transformed into a plurality of transformed relative seismic impedance traces 500 based on the number of parameter values. Although the mathematical operation has been described as including scaling, it should be understood that in some implementations the mathematical operation may include application of a threshold, clipping, root mean square, raising to a power and the like. In addition, although the relative seismic impedance trace has been described as being transformed using one mathematical operation, it should be understood that more than one mathematical operation may be used in transforming the relative seismic impedance trace.

Figure 6:
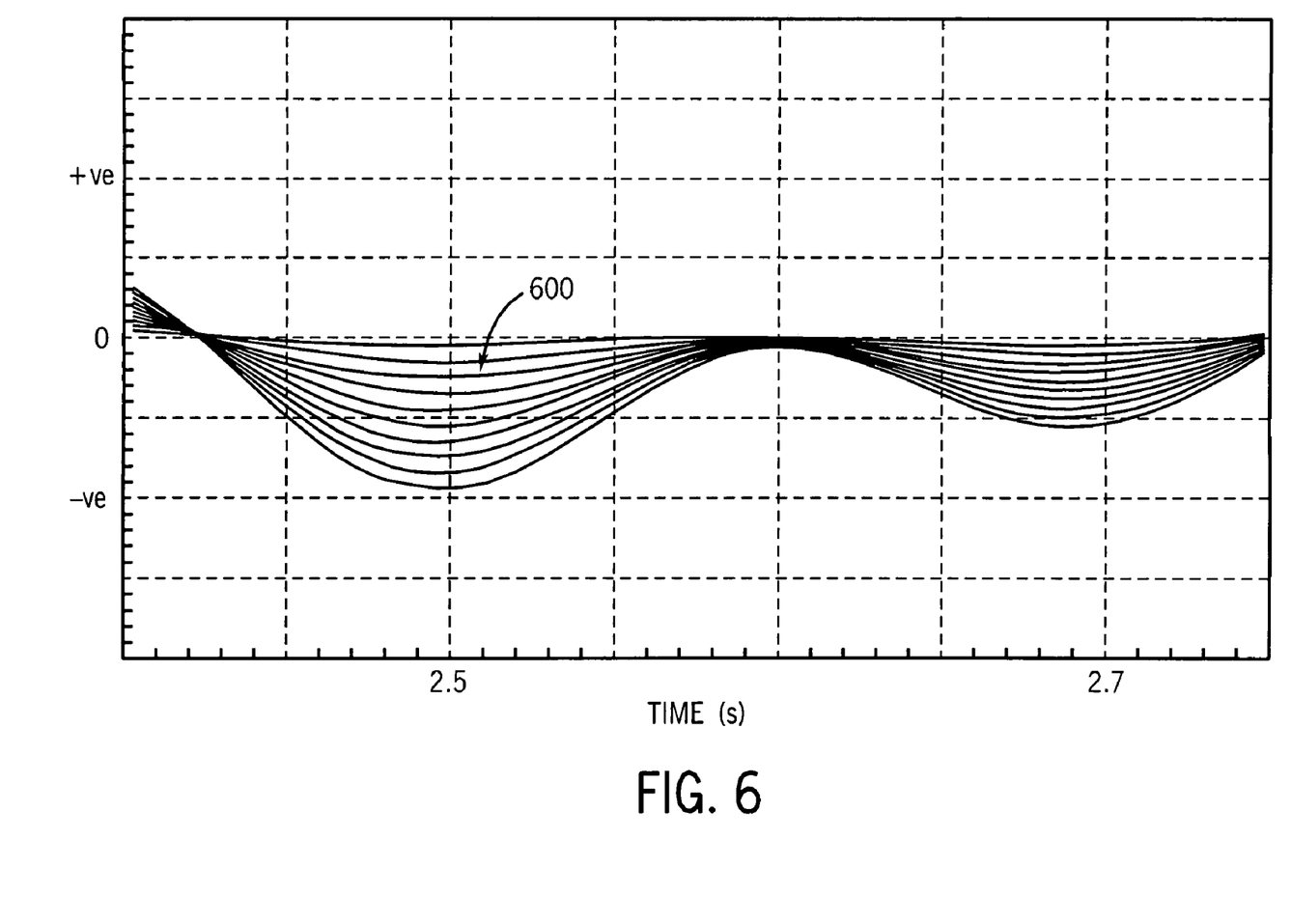
FIG. 6 illustrates a plurality of filtered transformed relative seismic impedance traces in accordance with implementation of various techniques described herein.

At step 220, the transformed relative seismic impedance traces may be convolved with a low pass filter to generate filtered transformed relative seismic impedance traces. FIG. 6 illustrates a plurality of filtered transformed relative seismic impedance traces 600 in accordance with implementation of various techniques described herein. In one implementation, the low pass filter may be configured to filter frequencies ranging from about 0 Hz to about 6 Hz. In another implementation, the low pass filter may be configured to filter frequencies ranging from the highest frequency of a compaction model, which will be described in more detail in the paragraphs below, to the lowest frequency of the recorded seismic trace. In one implementation, the highest frequency of the compaction model may be about 1 Hz, while the lowest frequency of the recorded seismic trace may be about 6 Hz.

Figure 7:
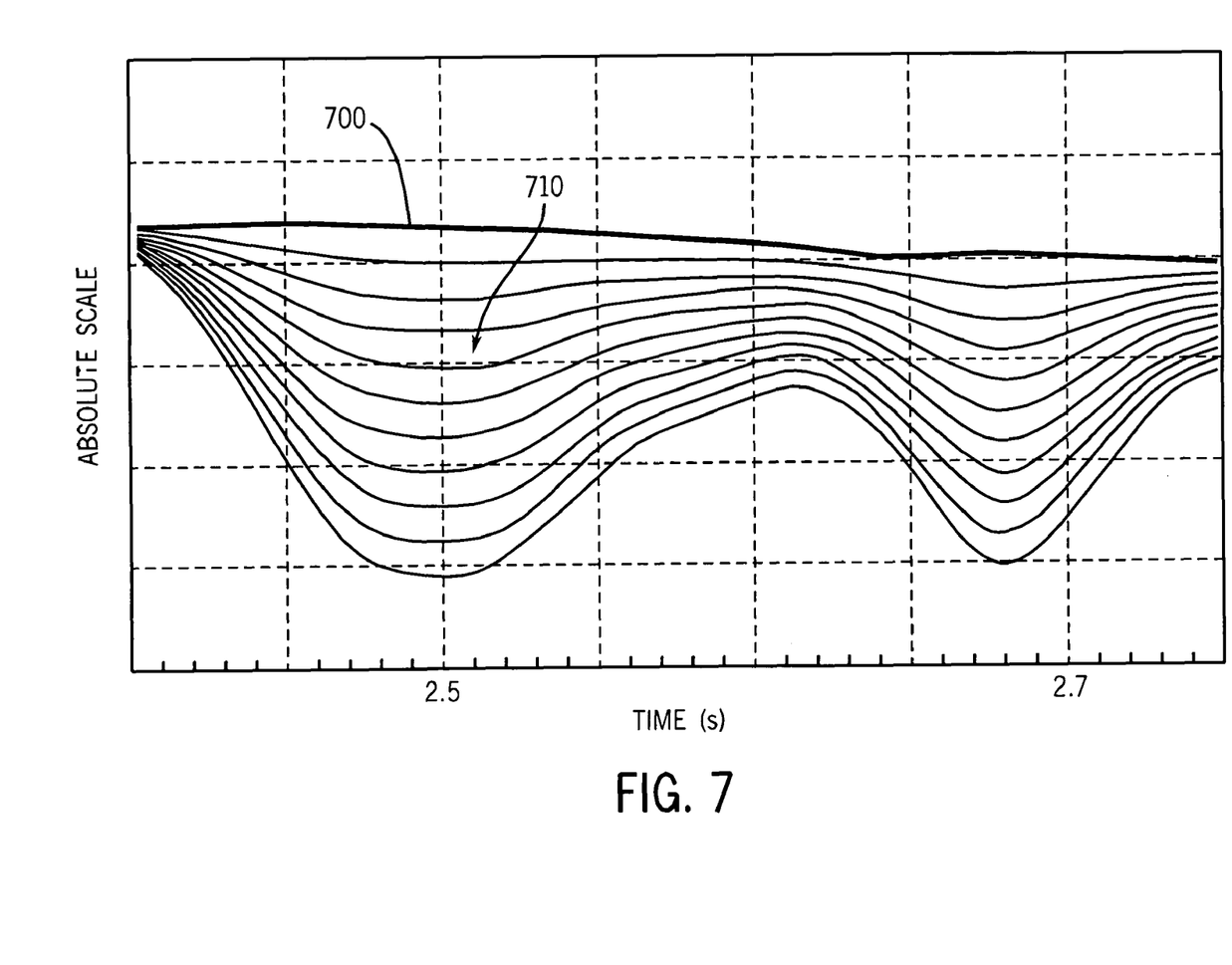
FIG. 7 illustrates a compaction model and a plurality of low frequency model traces in accordance with implementations of various techniques described herein.

At step 230, a compaction model may be added to the filtered transformed relative seismic impedance traces to generate low frequency model traces. FIG. 7 illustrates a compaction model 700 and a plurality of low frequency model traces 710 in accordance with implementations of various techniques described herein. The compaction model may represent the change of a certain attribute with respect to depth (or time), such as P wave velocity, S wave velocity, density and the like. The compaction model may be used to provide a trend for frequencies less than a predetermined frequency, such as 1 Hz. The compaction model may be derived from a velocity analysis during seismic data processing or from an average compaction trend of all the well data. In one implementation, the type of compaction model used may be based on the type of attribute represented by the seismic trace.

Figure 8:
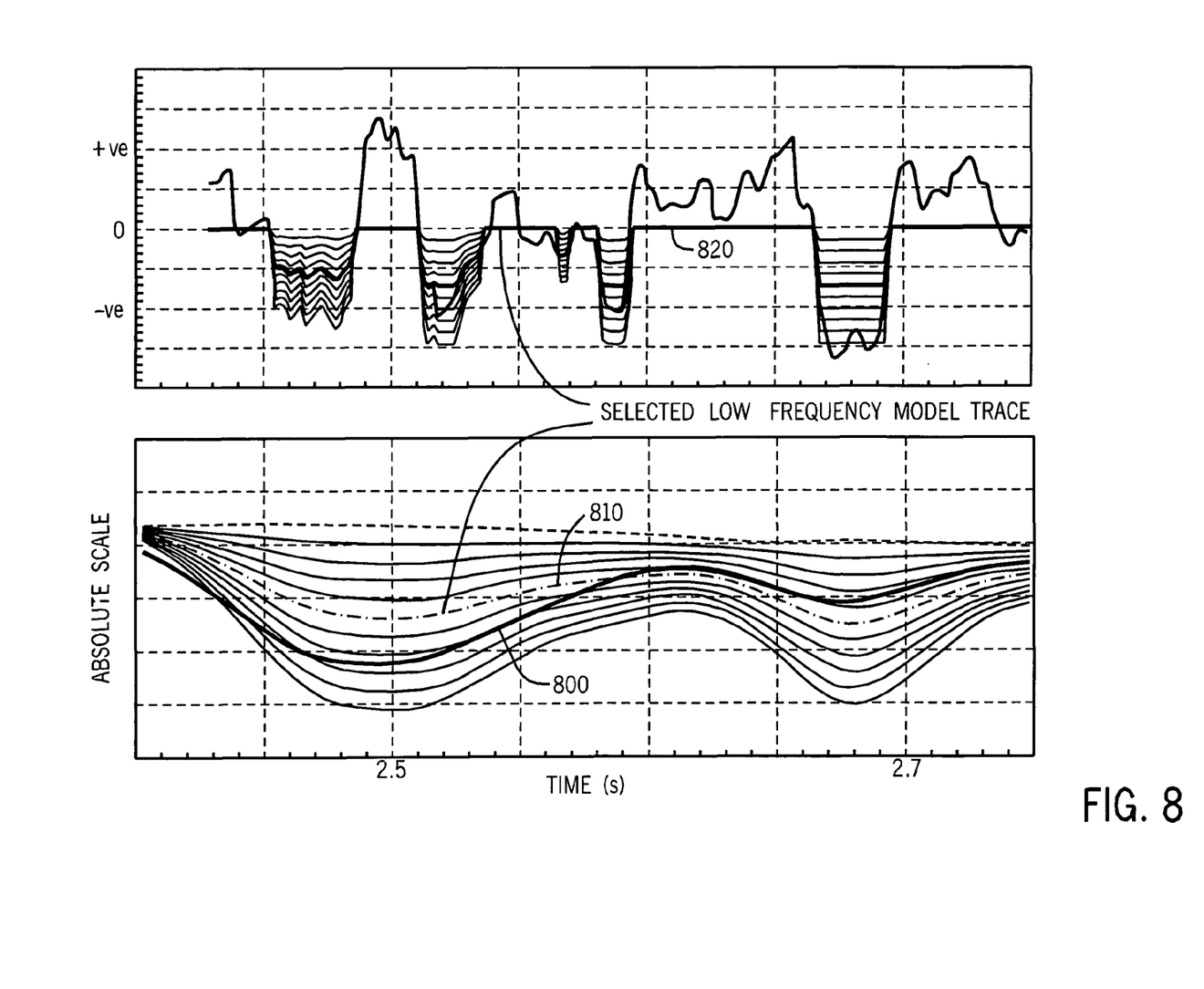
FIG. 8 illustrates a low frequency model trace that is closest to the measured response of the first well and a corresponding transformed relative seismic impedance trace in accordance with implementations of various techniques described herein.

At step 240, the low frequency model trace that is closest to the measured response of the first well is selected. In one implementation, the low frequency model trace that is closest in shape and amplitude to the measured well response is selected. The well response may have the same frequency range as the low pass filter, e.g., from about 0 Hz to about 6 Hz. This selection process may be performed using standard deviation techniques, correlation coefficient techniques and the like. As such, a fitness value of the closest low frequency model trace may be stored for later use. The fitness value may be used to indicate the extent of similarity between the selected low frequency model trace and the well response. FIG. 8 illustrates a low frequency model trace 810 that is closest in amplitude and shape to the measured response 800 of the first well and a corresponding transformed relative seismic impedance trace 820 in accordance with implementations of various techniques described herein.

At step 250, the parameter value of the transformed relative seismic impedance trace that corresponds to the selected low frequency model trace and the mathematical operation used to transform the relative seismic impedance trace may be determined and stored. In one implementation, the parameter value may be a scalar.

At step 260, steps 210-250 may be repeated for all wells within the seismic survey. As a result, a set of parameter values may be generated for all the wells within the seismic survey.

At step 270, an average parameter value for all the wells within the seismic survey may be calculated.

Steps 280-295 may be directed to application of the mathematical operation used to transform the relative seismic impedance traces and the average parameter value to every relative seismic impedance trace within the seismic survey. Accordingly, at step 280, each relative seismic impedance trace may be transformed using the mathematical operation used during calibration and the average parameter value.

At step 285, each transformed relative seismic impedance trace may be convolved with the low pass filter used during calibration. In one implementation, the low pass filter may be configured to filter frequencies ranging from the highest frequency of a compaction model, e.g., 1 Hz, to the lowest frequency of the recorded seismic trace, e.g., 6 Hz.

At step 290, a compaction model may be added to each filtered transformed relative seismic impedance trace to generate low frequency model traces. In one implementation, the compaction model may be the same one used during calibration.

At step 295, each low frequency model trace may be added to its corresponding relative seismic impedance trace within the seismic survey to generate an absolute trace.

In this manner, low frequency models may be estimated using relative seismic impedance traces without any reliance on well mapping and horizons interpretation. Although various implementations have been described as processing the negative portion of the relative seismic impedance trace, it should be understood that in some implementations the entire relative seismic impedance trace, including the positive portion, may be processed in accordance with various implementations described herein.

Figure 9:
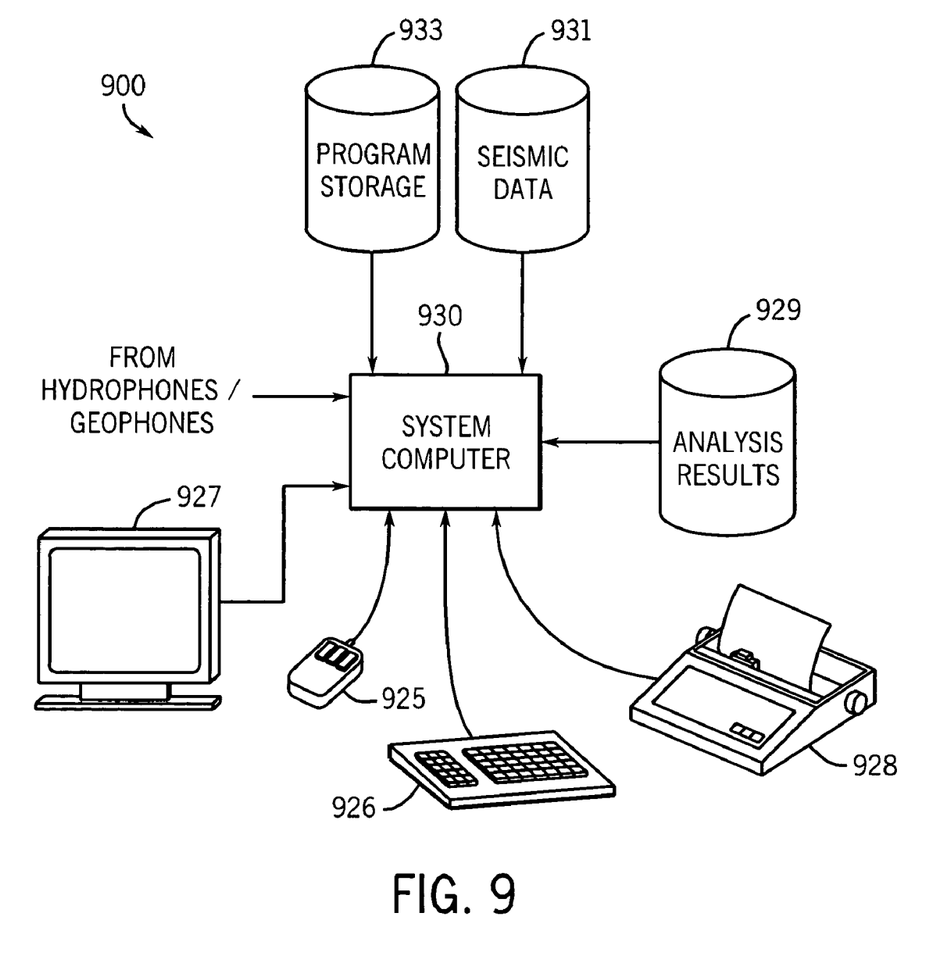
FIG. 9 illustrates a computer network into which implementations of various techniques described herein may be implemented.

FIG. 9 illustrates a computer network 900, into which implementations of various techniques described herein may be implemented. The computer network 900 may include a system computer 930, which may be implemented as any conventional personal computer or server. However, those skilled in the art will appreciate that implementations of various technologies described herein may be practiced in other computer system configurations, including hypertext transfer protocol (HTTP) servers, hand-held devices, multiprocessor systems, microprocessor-based or programmable consumer electronics, network PCs, minicomputers, mainframe computers, and the like.

The system computer 930 may be in communication with disk storage devices 929, 931, and 933, which may be external hard disk storage devices. It is contemplated that disk storage devices 929, 931, and 933 are conventional hard disk drives, and as such, will be implemented by way of a local area network or by remote access. Of course, while disk storage devices 929, 931, and 933 are illustrated as separate devices, a single disk storage device may be used to store any and all of the program instructions, measurement data, and results as desired.

In one implementation, seismic data from the receivers may be stored in disk storage device 931. The system computer 930 may retrieve the appropriate data from the disk storage device 931 to perform a seismic inversion method according to program instructions that correspond to implementations of various technologies described herein. The program instructions may be written in a computer programming language, such as C++, Java and the like. The program instructions may be stored in a computer-readable medium, such as program disk storage device 933. Such computer-readable media may include computer storage media and communication media. Computer storage media may include volatile and non-volatile, and removable and non-removable media implemented in any method or technology for storage of information, such as computer-readable instructions, data structures, program modules or other data. Computer storage media may further include RAM, ROM, erasable programmable read-only memory (EPROM), electrically erasable programmable read-only memory (EEPROM), flash memory or other solid state memory technology, CD-ROM, digital versatile disks (DVD), or other optical storage, magnetic cassettes, magnetic tape, magnetic disk storage or other magnetic storage devices, or any other medium which can be used to store the desired information and which can be accessed by the computing system 900. Communication media may embody computer readable instructions, data structures, program modules or other data in a modulated data signal, such as a carrier wave or other transport mechanism and may include any information delivery media. The term "modulated data signal" may mean a signal that has one or more of its characteristics set or changed in such a manner as to encode information in the signal. By way of example, and not limitation, communication media may include wired media such as a wired network or direct-wired connection, and wireless media such as acoustic, RF, infrared and other wireless media. Combinations of the any of the above may also be included within the scope of computer readable media.

In one implementation, the system computer 930 may present output primarily onto graphics display 927, or alternatively via printer 928. The system computer 930 may store the results of the methods described above on disk storage 929, for later use and further analysis. The keyboard 926 and the pointing device (e.g., a mouse, trackball, or the like) 925 may be provided with the system computer 930 to enable interactive operation.

The system computer 930 may be located at a data center remote from the survey region. The system computer 930 may be in communication with the receivers (either directly or via a recording unit, not shown), to receive signals indicative of the reflected seismic energy. These signals, after conventional formatting and other initial processing, may be stored by the system computer 930 as digital data in the disk storage 931 for subsequent retrieval and processing in the manner described above. While FIG. 9 illustrates the disk storage 931 as directly connected to the system computer 930, it is also contemplated that the disk storage device 931 may be accessible through a local area network or by remote access. Furthermore, while disk storage devices 929, 931 are illustrated as separate devices for storing input seismic data and analysis results, the disk storage devices 929, 931 may be implemented within a single disk drive (either together with or separately from program disk storage device 933), or in any other conventional manner as will be fully understood by one of skill in the art having reference to this specification.

While the foregoing is directed to implementations of various technologies described herein, other and further implementations may be devised without departing from the basic scope thereof, which may be determined by the claims that follow. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A seismic inversion method, comprising:
   estimating a recorded seismic trace representing subterranean formations in the earth at a well location;
   transforming the recorded seismic trace to a relative seismic impedance trace, wherein the relative seismic impedance trace does not contain any information below the lowermost recorded seismic frequency;
   estimating a low frequency model trace using the relative seismic impedance trace, wherein the low frequency model trace is a band limited trace in the frequency domain with a frequency range between about 0 Hz and the lowest seismic recorded frequency; and
   adding the low frequency model trace to the relative seismic impedance trace to generate an absolute trace representing information about P wave, S wave, density or combinations thereof.

2. The method of claim 1, wherein estimating the low frequency model trace comprises transforming the relative seismic impedance trace using one or more mathematical operations and one or more parameter values to generate a plurality of transformed relative seismic impedance traces.

3. The method of claim 2, wherein the mathematical operations comprise a scaling operation.

4. The method of claim 2, wherein estimating the low frequency model trace further comprises convolving each transformed relative seismic impedance trace with a low pass filter.

5. The method of claim 4, wherein the low pass filter is configured to filter frequencies ranging from about 1 Hz to about 6 Hz.

6. The method of claim 4, wherein the low pass filter is configured to filter frequencies ranging from about 0 Hz to about 6 Hz.

7. The method of claim 4, wherein the low pass filter is configured to filter frequencies ranging from the highest frequency of a compaction model to the lowest frequency of the recorded seismic trace.

8. The method of claim 4, wherein estimating the low frequency model trace further comprises adding a compaction model to each filtered transformed relative seismic impedance trace to generate a plurality of low frequency model traces.

9. The method of claim 8, wherein estimating the low frequency model trace further comprises selecting a low frequency model trace that is closest in shape and amplitude to a well response at the well location.

10. The method of claim 9, wherein the low frequency model trace is selected using at least one of a standard deviation technique and a correlation coefficient technique.

11. The method of claim 10, wherein estimating the low frequency model trace further comprises determining a parameter value of a transformed relative seismic impedance trace that corresponds to the selected low frequency model trace.

12. The method of claim 10, wherein estimating the low frequency model trace further comprises computing an average parameter value for all well locations within a seismic survey.

13. The method of claim 1, wherein the information comprises numerical values representing P wave impedance and S wave impedance.

* * * * *